United States Patent
Anantaram et al.

(10) Patent No.: US 10,410,622 B2
(45) Date of Patent: Sep. 10, 2019

(54) SYSTEMS AND METHODS FOR AUTOMATIC REPAIR OF SPEECH RECOGNITION ENGINE OUTPUT USING A SLIDING WINDOW MECHANISM

(71) Applicant: Tata Consultancy Services Limited, Mumbai (IN)

(72) Inventors: Chandrasekhar Anantaram, Gurgaon (IN); Sunil Kumar Kopparapu, Thane (IN); Chiragkumar Rameshbhai Patel, Thane (IN); Aditya Mittal, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/649,010

(22) Filed: Jul. 13, 2017

(65) Prior Publication Data

US 2018/0018960 A1    Jan. 18, 2018

(30) Foreign Application Priority Data

Jul. 13, 2016    (IN) .............................. 201621024006

(51) Int. Cl.
*G10L 15/02*    (2006.01)
*G10L 15/08*    (2006.01)
*G10L 21/00*    (2013.01)
*G10L 15/01*    (2013.01)
*G06F 17/27*    (2006.01)
*G10L 15/20*    (2006.01)
(Continued)

(52) U.S. Cl.
CPC ............ *G10L 15/01* (2013.01); *G06F 17/273* (2013.01); *G06F 17/2785* (2013.01); *G10L 15/183* (2013.01); *G10L 15/20* (2013.01); *G10L 15/24* (2013.01); *G10L 15/26* (2013.01); *G10L 21/00* (2013.01)

(58) Field of Classification Search
CPC .... G06F 17/30867; G10L 15/08; G10L 21/00
USPC ....................................................... 704/257
See application file for complete search history.

(56) References Cited

U.S. PATENT DOCUMENTS 9,497,594 B2    11/2016    Xie et al.
2002/0095295 A1    7/2002    Cohen et al.
(Continued)

*Primary Examiner* — Farzad Kazeminezhad
(74) *Attorney, Agent, or Firm* — Finnegan, Henderson, Farabow, Garrett & Dunner LLP

(57) ABSTRACT

Text output of speech recognition engines tend to be erroneous when spoken data has domain specific terms. The present disclosure facilitates automatic correction of errors in speech to text conversion using abstractions of evolutionary development and artificial development. The words in a speech recognition engine text output are treated as a set of injured genes in a biological cell that need repair which are then repaired and form genotypes that are then repaired to phenotypes through a series of repair steps based on a matching, mapping and linguistic repair through a fitness criteria. A basic genetic level repair involves phonetic MATCHING function together with a FITNESS function to select the best among the matching genes. A second genetic level repair involves a contextual MAPPING function for repairing remaining 'injured' genes of the speech recognition engine output. Finally, a genotype to phenotype repair involves using linguistic rules and semantic rules of the domain.

17 Claims, 7 Drawing Sheets

(51) Int. Cl.
*G10L 15/183* (2013.01)
*G10L 15/24* (2013.01)
*G10L 15/26* (2006.01)

(56) References Cited

U.S. PATENT DOCUMENTS

2008/0154870 A1\* 6/2008 Evermann ......... G06F 17/30867
2013/0080177 A1\* 3/2013 Chen ..................... G10L 15/26
  704/275
2014/0122069 A1  5/2014 Bravin et al.
2015/0058018 A1\* 2/2015 Georges ................. G10L 15/08
  704/257

\* cited by examiner

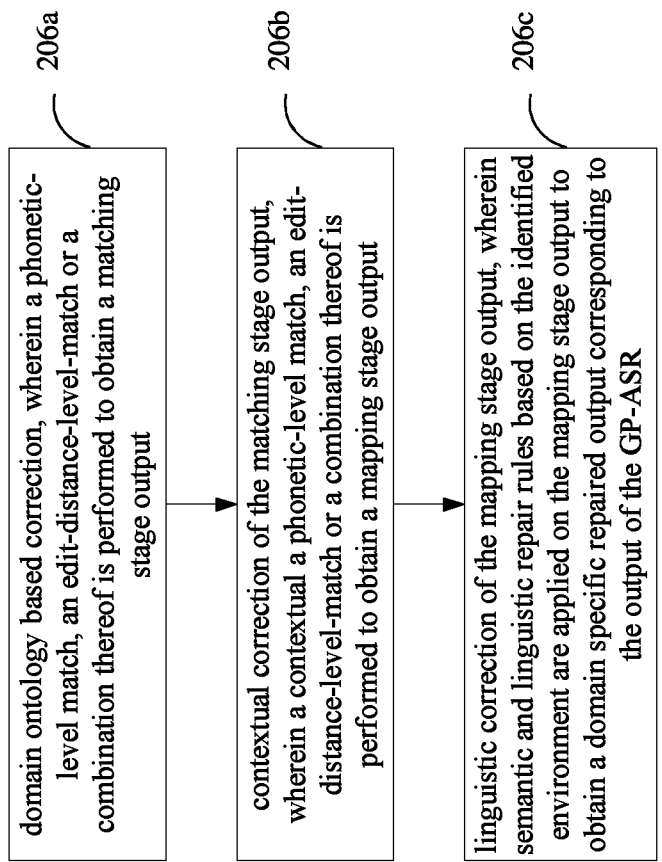
FIG.3 (contd.)

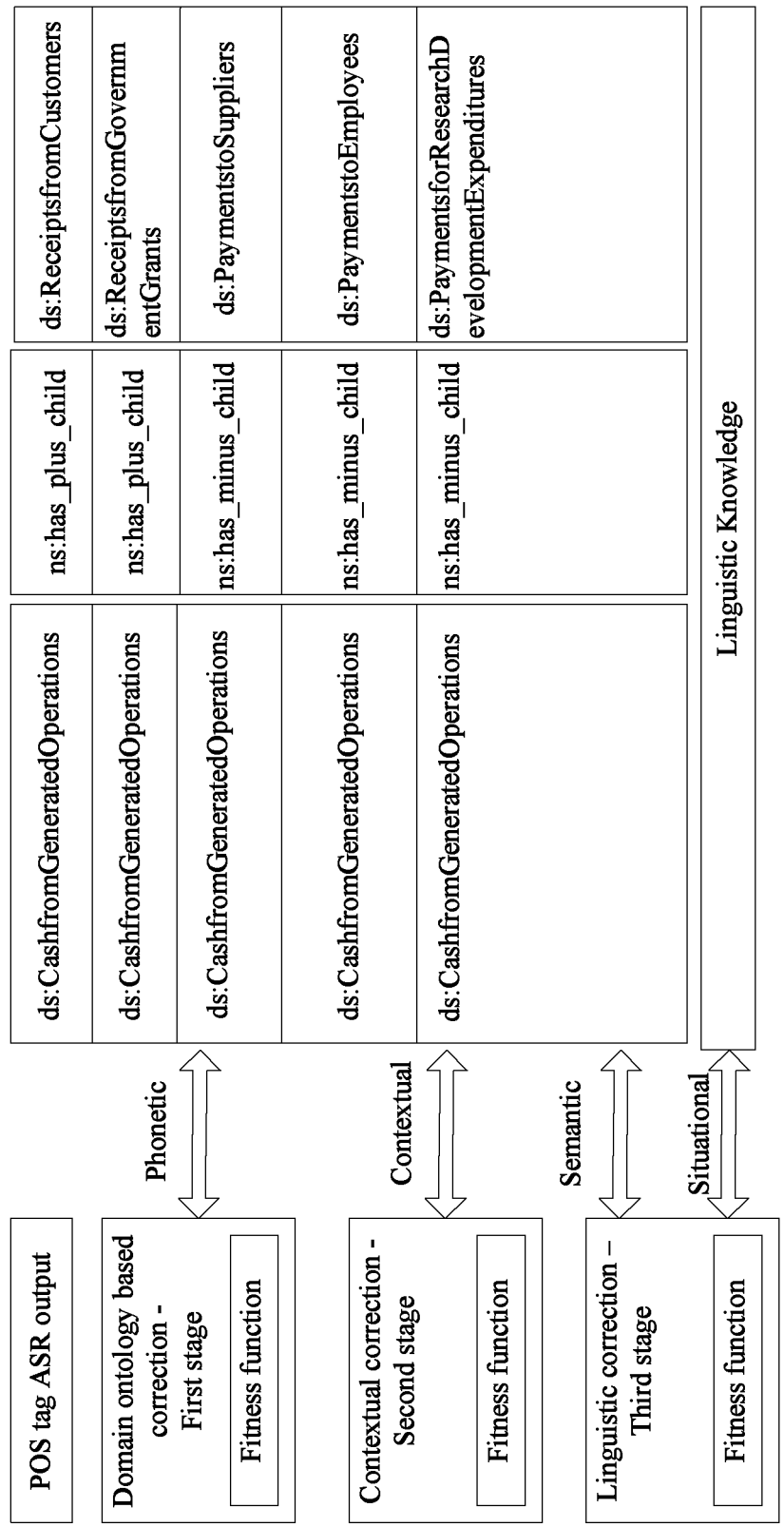
FIG.4 (contd.)

SYSTEMS AND METHODS FOR AUTOMATIC REPAIR OF SPEECH RECOGNITION ENGINE OUTPUT USING A SLIDING WINDOW MECHANISM

PRIORITY CLAIM

This U.S. patent application claims priority under 35 U.S.C. § 119 to: Indian Patent Application No. 201621024006, filed on Jul. 13, 2016. The entire contents of the aforementioned application are incorporated herein by reference.

TECHNICAL FIELD

The embodiments herein generally relate to correction of output of speech recognition engines, and, more particularly, to methods and systems for automatically enhancing speech recognition output for effective natural language processing.

BACKGROUND

General-purpose speech engines are trained on large corpus. However, studies and experiments have shown that when such speech engines are used to recognize spoken sentences in specific domains they may not produce accurate automatic speech recognition (ASR) output. Further, accent and environmental conditions in which a speaker speaks a sentence may induce a speech engine to recognize certain words or sets of words inaccurately. Thus, the speech engine's output may need to be repaired for a domain before any further natural language processing is carried out.

SUMMARY

Embodiments of the present disclosure present technological improvements as solutions to one or more of the above-mentioned technical problems recognized by the inventors in conventional systems.

In an aspect, there is provided a processor implemented method comprising: receiving a text output from a general purpose automatic speech recognition (GP-ASR) engine; identifying in real-time, a current environment of a speaker associated with the text output based on one or more environment variables associated thereof; and automatically and selectively correcting the output of the GP-ASR by replacing one or more erroneously recognized terms in the text output with one or more best-fit terms based on at least a fitness function and a pre-determined threshold associated with the identified current environment.

In another aspect, there is provided a system comprising: one or more data storage devices operatively coupled to the one or more processors and configured to store instructions configured for execution by the one or more processors to: receive a text output from a general purpose automatic speech recognition (GP-ASR) engine; identify in real-time, a current environment of a speaker associated with the text output based on one or more environment variables associated thereof; the identified current environment being classified as at least one of a broad classification and a granular classification; and automatically and selectively correct the output of the GP-ASR by replacing one or more erroneously recognized terms in the text output with one or more best-fit terms based on at least a fitness function and a pre-determined threshold associated with the identified current environment.

In yet another aspect, there is provided a computer program product comprising a non-transitory computer readable medium having a computer readable program embodied therein, wherein the computer readable program, when executed on a computing device, causes the computing device to: receive a text output from a general purpose automatic speech recognition (GP-ASR) engine; identify in real-time, a current environment of a speaker associated with the text output based on one or more environment variables associated thereof; the identified current environment being classified as at least one of a broad classification and a granular classification; and automatically and selectively correct the output of the GP-ASR by replacing one or more erroneously recognized terms in the text output with one or more best-fit terms based on at least a fitness function and a pre-determined threshold associated with the identified current environment.

In an embodiment of the present disclosure, the method described herein above further comprises: receiving speech input associated with the speaker and information pertaining to the current environment associated thereof; and deriving the one or more environment variables from the received speech input and the information pertaining to the current environment.

In an embodiment of the present disclosure, the one or more environment variables are based on one or more of (i) location information associated with the speaker; (ii) movement information associated with the speaker; (iii) olfactory information; (iv) proximity information; and (v) image information.

In an embodiment of the present disclosure, the identified current environment is classified as at least one of a broad classification and a granular classification.

In an embodiment of the present disclosure, the pre-determined threshold is empirical.

In an embodiment of the present disclosure, the step of automatically and selectively correcting the output of the GP-ASR comprises performing multi-stage correction steps on the received output, the multi-stage correction steps comprising one or more of: domain ontology based correction, wherein a phonetic-level match, an edit-distance-level-match or a combination thereof is performed to obtain a matching stage output; contextual correction of the matching stage output, wherein a contextual phonetic-level match, an edit-distance-level-match or a combination thereof is performed to obtain a mapping stage output; and linguistic correction of the mapping stage output, wherein semantic and linguistic repair rules based on the identified current environment are applied on the mapping stage output to obtain a domain specific repaired output corresponding to the output of the GP-ASR.

In an embodiment, the multi-stage correction steps are iteratively repeated based on the real-time current environment.

In an embodiment of the present disclosure, the fitness function for domain ontology based correction is a weighted cost function that matches the text output with a first set of candidate terms from the domain ontology based on a sliding window mechanism; and replaces the one or more erroneously recognized terms in the text output with one or more best-fit terms from the first set of candidate terms from the domain ontology based on the pre-determined threshold associated with the identified current environment.

In an embodiment of the present disclosure, the fitness function for contextual correction is a weighted cost function that maps the matching stage output with a second set of candidate terms from the domain ontology based on a sliding window mechanism; and replaces the one or more erroneously recognized terms in the matching stage output with one or more best-fit terms from the second set of candidate terms from the domain ontology based on the pre-determined threshold associated with the identified current environment.

In an embodiment of the present disclosure, the fitness function for the linguistic correction is a function of the mapping stage output and a set of semantic and linguistic repair rules.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
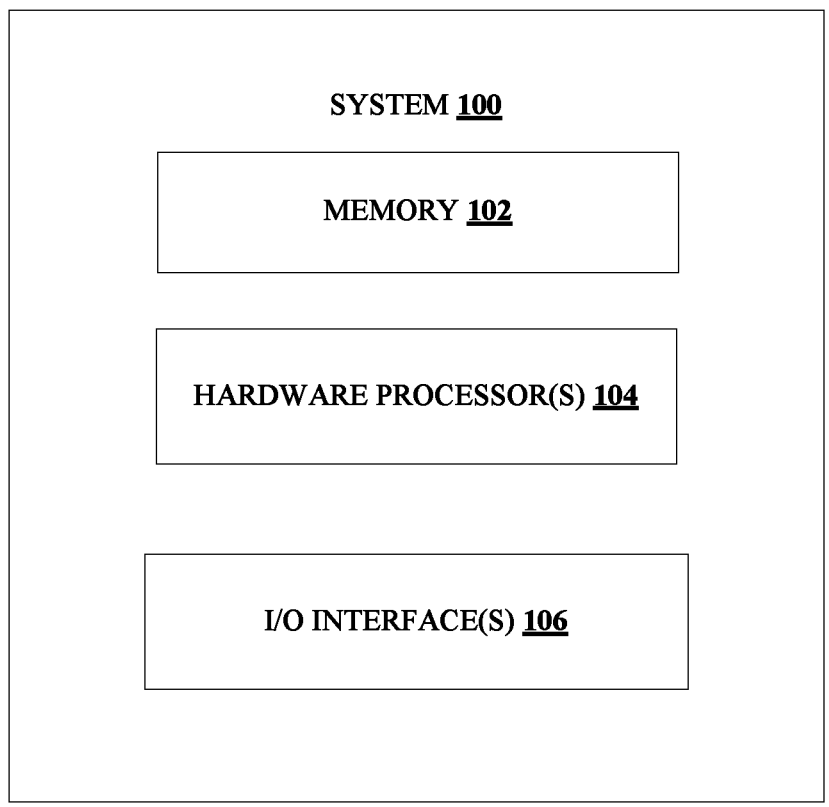
FIG. 1 illustrates an exemplary block diagram of a system for automatic correction of speech recognition engine output, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

The process of interpretation of a spoken query is subject to the accuracy of the speech recognition engine that converts the spoken speech into text. Typical recognition accuracies for domain-specific speech recognition systems that cover a large vocabulary have been observed to be about 50 to 60% for natural spoken speech. Environmental noise, variations in accent, poor ability to express on the part of the user, or inadequate resources to build a recognition system also affect the accuracy adversely. Building an ASR is involved and expensive in terms of effort, both CPU (computing intensive) and people expertise and takes a long time to enhance the performance in terms of recognition accuracies. An ASR engine needs to be trained over very large corpus in order to handle various accents of speakers, different background noises that people can speak in, variety of sentences that people can speak, different language expressions that people use, emotions of people that can influence the speech, etc. For these reasons making an ASR engine very domain specific is not recommended because it is hard to train a new engine in all these aspects. Further, domain specific words would invariably be phonetically close to an existing word in the ASR LM. Also building a credible ASR engine requires a farm of hardware-servers to actually train the engine which is probably not feasible for smaller enterprises. Further, maintaining an ASR engine for each domain might not be very efficient. For this purpose a prebuilt general purpose ASR (GP-ASR) which has been trained over a very large corpus and over a very large vocabulary is used in the present disclosure. However, since the GP-ASR is not trained with any specific domain words, post processing the GP-ASR's output text (for example, through the method of the present disclosure) is much simpler and economical as explained in detail hereinafter.

Again, long spoken utterances are more difficult for the ASR engines to recognize than shorter sentences. For this reason, as ASR engines get better and better in terms of their training, they are able to recognize shorter sentences with far better accuracy than longer sentences. For example, spoken /Show me hotels in Andheri/ is easier than /Could you please let me know a hotel that is open at exactly this point of time because I am very hungry and I need to eat a cooked meal/ this is because the way ASRs are built are based on Language model which is mostly tri-gram and are built based on what is most likely to be asked by a speaker.

For freely spoken natural language sentences, a typical recognition accuracy achievable for state-of-the-art general purpose speech recognition systems have been observed to be about 60% to 90% in real-world environments [Fusayasu et al., 2015; Morbini et al., 2013]. However, automatic speech recognition (ASR) engines may at times perform even worse when used in specific domains where specialized domain terms appear that are not available in general corpus [Twiefel et al., 2014]. Other factors such as variations in speaker's accent, background noise, device characteristics and poor ability to express on the part of the speaker may also affect accuracy of the ASR engine's text output. As a consequence it would be problematic to use the ASR engine's output as-is and attempt natural language processing such as automated question-answering, of such erroneous partially recognized terms. It is therefore critical to repair the ASR engine's text output to improve its accuracy vis-à-vis the specific domain. Systems and methods of the present disclosure facilitate automatic correction of speech recognition engine output.

Methods and systems of the present disclosure enable repairing text output of state-of-the art general purpose automatic speech recognition (GP-ASR) engines. The methods of the present disclosure are motivated by evolutionary development (Evo-Devo) inspired artificial development processes (Art-Dev) [Tufte, 2009; Harding and Banzhaf, 2008]. In the methods of the present disclosure, an ASR engine's text output is considered as a biological cell and it is grown through evolution and development of partial genes (partial domain-terms) present in the text output with respect to genes (domain-terms) in the domain. Once genotypes (set of possible domain-terms) are identified, the genotypes are grown into phenotypes to fill missing gaps by replacing erroneous recognized terms in the text output by a corresponding fittest domain-term. A key driving factor for the methods and systems of the present disclosure is identification of the environment associated with the speaker that influences the accuracy of the text output of the GP-ASR.

Referring now to the drawings, and more particularly to FIGS. 1 through 5, where similar reference characters denote corresponding features consistently throughout the figures, there are shown preferred embodiments and these embodiments are described in the context of the following exemplary system and method.

It may be noted that the expressions "correction" and "repair" would mean the same in the context of the present disclosure and would refer to the enhancement of speech recognition output. Also, in the context of the present disclosure, the expressions "text" and "terms" may refer to one or more words.

FIG. 1 illustrates an exemplary block diagram of a system 100 for automatic correction of speech recognition engine output, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Figure 2:
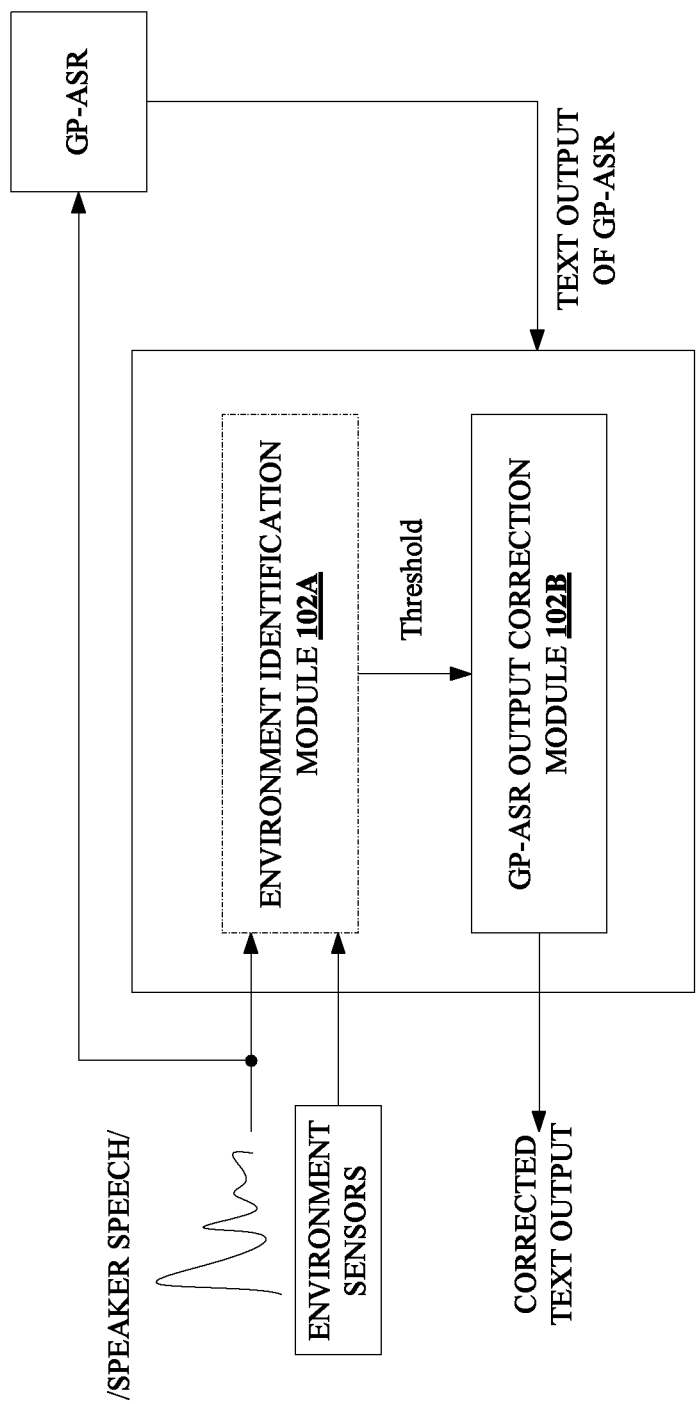
FIG. 2 illustrates an exemplary high level architecture of the system of FIG. 1, in accordance with an embodiment of the present disclosure.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (102A and 102B of FIG. 2) of the system 100 can be stored in the memory 102. FIG. 2 illustrates an exemplary high level architecture of the system of FIG. 1 with exemplary modules 102A representing an environment identification module and 102B representing a GP-ASR output correction module, in accordance with an embodiment of the present disclosure. As explained herein below, the environment identification module 102A may be configured to store instructions pertaining to identification of current environment associated with the speaker and the GP-ASR output correction module may be configured to store instructions pertaining to correction of the text output based on the identified current environment in accordance with the methods of the present disclosure.

Figure 3:
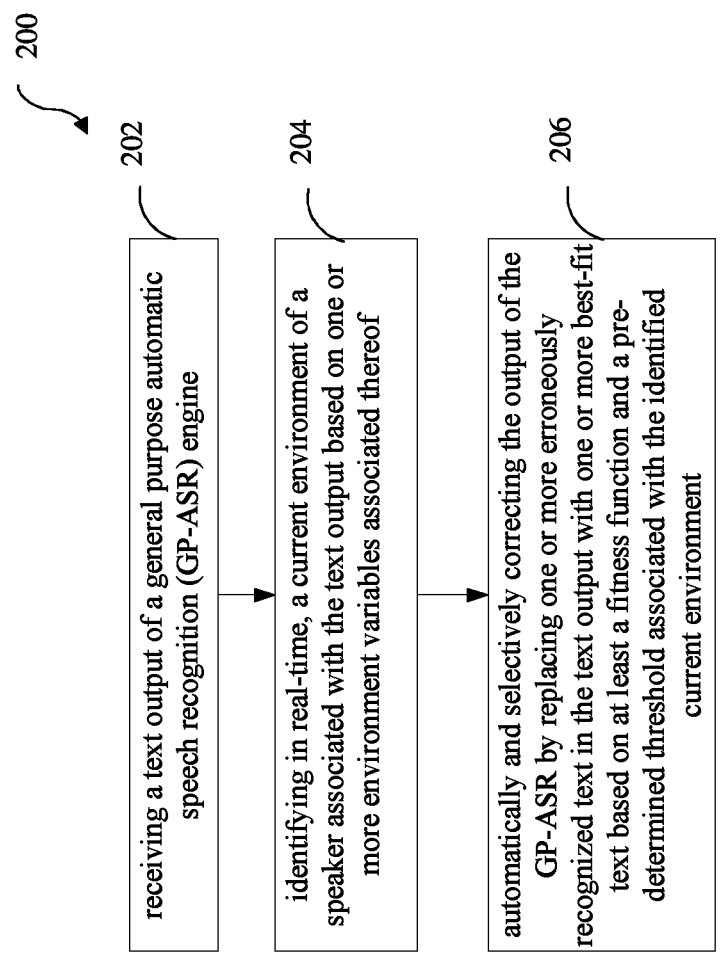
FIG. 3 is an exemplary flow diagram illustrating a computer implemented method for automatic correction of speech recognition engine output, in accordance with an embodiment of the present disclosure.

FIG. 3 is an exemplary flow diagram illustrating a computer implemented method 200 for automatic correction of speech recognition engine output, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

In an embodiment of the present disclosure, the one or more processors 104 are configured to receive a text output, at step 202, from a general purpose automatic speech recognition (GP-ASR) engine. The GP-ASR engine may be any of the state-of-the-art speech engines, for instance, Google Now™ or IBM Watson™ speech engine. The text output of the GP-ASR serves as an input to the system 100 of the present disclosure. This input may be fed to the system 100 through a web-interface, a graphical user interface, or a command-line interface.

As an example, a sentence spoken by a speaker (H1) in a financial domain may be "The return on plan assets include interest earned, dividends earned, realized and unrealized gains or losses less taxes payable by the plan less administrative costs of the plan". A state-of-the-art GP-ASR like Google Now™ recognized this sentence as—(G1): "the return on plan acids include interest on dividends and realized and unrealized games or losses less taxes payable by the plan let administrative process of the plan".

In accordance with the present disclosure, the GP-ASR text output is treated as a biological cell that encodes 'species-specific' genes of the domain representing concepts in the sentences spoken by the speaker. However, in the process of speech recognition, wherein the spoken-audio is converted to text output, the GP-ASR output may not be an accurate representation of what was spoken as seen from the illustrated example. The GP-ASR text output being considered as a set of genes, it may be understood that one or more genes are 'injured' during the speech recognition process. The systems and methods of the present disclosure repair the 'injured' genes through an artificial development approach, with evolution and development of the partial gene present in the ASR output with respect to the species-specific genes present in the domain (which encodes the concepts of the domain).

In accordance with partial gene matching method of the present disclosure, it is noted that there is no relationship in the domain ontology between plan acids and interest earned, whereas there is a relationship between plan assets and interest earned. Further the phonetic match between plan acids and plan assets provides a fitness match to replace the inaccurately recognized terms plan acids with the domain relevant term plan assets.

Thus using systems and methods of the present disclosure, (G1) is repaired to—(E1) as: "the return on plan assets include interest on dividends and realized and unrealized gains or losses less taxes payable by the plan let administrative process of the plan", thereby resulting in a relatively more accurate speech to text conversion with respect to the domain.

In the context of the present disclosure, the 'fittest' domain gene replaces the partial gene in the GP-ASR text output through a multi-stage correction process involving matching and mapping processes. The set of all genes remaining in the sentence forms the genotypes of the sentence. Once the genotypes are identified, they are grown into phenotypes to remove grammatical and linguistic errors in the GP-ASR text output. The partially repaired GP-ASR text output may be parsed and part of speech (POS) tags are evaluated to find any linguistic inconsistencies, which are then repaired. For instance, a sentence may have a WP-tag (Wh-pronoun), but a WDT-tag (Wh-determiner) may be missing. Using such clues appropriate parts are identified and the sentence is repaired. Linguistic and semantic repairs form the genotype to phenotype repair. The multi-stage correction process of the present disclosure will be discussed in more detail in the steps that follow hereafter.

In an embodiment of the present disclosure, the one or more processors 104 are configured to identify in real-time, at step 204, a current environment of the speaker associated with the text output based on one or more environment variables associated thereof. In an embodiment, the identified current environment may be classified as at least one of a broad classification and a granular classification. For instance, the identified current environment could be broadly classified as {noisy, silent} or fine-grained classified like {railway station, canteen, auditorium, raining in the background, road noise, hospital, and the like}. The environment may be identified based on the associated environment variables received by the system 100. Alternatively, the one or more processors 104 may be configured to receive speech input associated with the speaker and information pertaining to the current environment from various environment sensors and may derive the one or more environment variables. In an embodiment the one or more environment variables may be based on one or more of location information associated with the speaker; movement information associated with the speaker; olfactory information; proximity information; and image information. For instance, location information from latitude-longitude sensor may be used to decipher if the speaker is located indoor or outdoor, say, in a stadium. Movement information from say, an accelerometer may be used to determine if the speaker is in a moving vehicle. Another exemplary environment sensor may be an electronic nose or a proximity sensor that may be used to determine close speech or distant speech. Again image information from, say, a camera sensor may be used to determine the volume of a room when indoors.

It is to be noted that environment has a significant influence on the performance of a general purpose ASR engine in terms of accuracy. The identified current environment is used to decide a threshold (T) of a fitness function that facilitates identifying a 'fittest' or "best-fit" term for replacing one or more erroneously recognized terms. Accordingly, in an embodiment, the one or more processors 104 are configured to automatically and selectively correct the output of the GP-ASR, at step 206, by replacing one or more erroneously recognized terms in the text output with one or more best-fit terms based on at least a fitness function and a pre-determined threshold associated with the identified current environment. Different environments may have different fitness functions and different pre-determined thresholds. In an embodiment, the pre-determined thresholds are empirical values. The step 206 of automatically and selectively correcting the output of the GP-ASR comprises performing multi-stage correction steps on the received text output from the GP-ASR based on the identified environment as represented herein below.

INPUT: ASR output sentence that has been marked erroneous: asr_out_sentence; domain_ontology; environment
OUTPUT: Repaired sentence: repaired_sentence
{
1: asr_out_parsed_sentence←POStag(asr_out_sentence)
2: part_repaired_sentence←first_level_genetic_repair(asr_out_parsed_sentence, environment)
3: part_repaired_sentence2←second_level_genetic_repair(part_repaired_sentence, environment)
4: repaired_sentence←linguistic_repair(part_repaired_sentence2)
}
5: function first_level_genetic_repair(asr_out_parsed_sentence, environment) for all nouns_verbs in asr_out_parsed_sentence do steps 6 to 11
6: nouns_-verbs←find(asr_out_parsed_sentence, nouns_-verbs_-POStoken)
7: concepts_referred←part_match(nouns_verbs, domain_ontology, environment)
8: candidate_genes←add(domain-onotology-entry, concepts_referred)
9: fit_gene←fittest(candidate_genes, POStoken, environment)
10: genotypes←add(fit_gene)
11: repaired_sentence←substitute(asr_out_parsed_sentence, nouns_-verbs, genotypes)
12: end function: return repaired_sentence
13: function second_level_genetic_repair(part_repaired_sentence, environment)
for all terms_appearing in part_repaired_sentence do steps 14 to 19
14: concepts_referred←match(terms_appearing, domain_ontology)
15: concepts_to_consider←map(concepts_referred, erroneous_part, domain_ontology, environment)
16: candidate_genes←add(domain-ontology-entry, concepts_to_consider)
17: fit_gene←fittest(candidate_genes, concepts_referred, environment)
18: genotypes←add(fit_gene)
19: repaired_sentence←substitute(part_repaired_sentence, concepts_to_consider, genotypes)
20: end function: return repaired_sentence
21:function linguistic_repair(part_repaired_sentence2, environment) for all POStags other than nouns and verbs do steps 22 to 27
22: other POStags←find(part_repaired_sentence2, remaining POStokens)
//find candidate words for linguistic error
23:ling_err←linguistic_check(part_repaired_sentence2, other POStags, environment)
//find the closest linguistic rule based-match for error words
24:candidate words←add(ling_err, environment)
//find fittest word among candidate words
25:fit_word←fittest_word(candidate_words, ling_err, environment)
//replace ling_err with the fittest word into repaired sentence
26:repaired_sentence←replace(part_repaired_sentence2, ling_err, fit_word, other POStags)
27:return repaired_sentence
28:end function As seen from the above exemplary pseudo-code, in accordance with an embodiment of the present disclosure, domain ontology based correction (step 206a) forms a first stage of correction wherein a phonetic-level match, an edit-distance-level-match or a combination of both the matches is performed to obtain a matching stage output.

In accordance with an embodiment of the present disclosure, contextual correction of the matching stage output (step 206b) forms a second stage of correction, wherein a contextual phonetic-level match, an edit-distance-level-match or a combination of both matches is performed to obtain a mapping stage output.

In accordance with an embodiment of the present disclosure, linguistic correction of the mapping stage output (step 206c) forms a third stage of correction, wherein semantic and linguistic repair rules based on the identified current environment are applied on the mapping stage output to obtain a domain specific repaired output corresponding to the output of the GP-ASR.

In an embodiment the three stages may be iteratively performed based on the information received pertaining to the real-time current environment. Thus, rather than a simple match and replace mechanism, the present disclosure provides a process that automatically and systematically improves the text output of the GP-ASR to make it accurate with respect to the domain.

The description hereinafter focusses on the three stage correction of the text output of the GP-ASR, influence of the identified current environment and the pre-determined threshold associated thereof. With regards to the first stage of correction viz., the domain ontology based correction, let $S=\{w_1, w_2, w_3, \ldots w_n\}$ be the set of words in the ASR-output(asr_out). Let $D=\{dt_1, dt_2, dt_3, \ldots dt_m\}$ be the domain-ontology-terms. These terms may be considered as candidate genes that can possibly replace the ASR output (asr_out) words that may be erroneously recognized. A sliding window of length/consisting of words $\{w_i, \ldots, w_{i+l-1}\}$ is considered for matching with domain-ontology-terms. The length l may vary from 1 to p, where p may be decided based on the environmental information. For example, if the domain under consideration has financial terms then p may be five words, while for a domain pertaining to car parts, p may be two words.

A cost function, say $C(\{w_i, \ldots, w_{i+l-1}\}, dt_k)$ is computed such that minimizing $C(\{w_i, \ldots, w_{i+l-1}\}, dt_k)$ would result in dt* which may be a possible candidate to replace $\{w_i, \ldots, w_{i+l-1}\}$, namely, $$dt^* = \min\_\{G\} C(\{w_i, \ldots, w_{i+l-1}\}, dt_k)$$

The cost function $C(\{w_i, \ldots, w_{i+l-1}\}, dt_k) =$ $b_1$*soundex(each-word-in$\{w_i, \ldots, w_{i+l-1}\}$,each-word-in$\{dt_k\}$)+

$b_2$*metaphone(each-word-in$\{w_i, \ldots, w_{i+l-1}\}$,each-word-in$\{dt_k\}$)+

$b_3$*(edit_distance(each-word-in$\{w_i, \ldots, w_{i+l-1}\}$, each-word-in$\{dt_k\}$)+

$b_4$*(number_of_syllables(each-word-in$\{w_i, \ldots, w_{i+l-1}\}$)− number_of_syllables(each-word-in$\{w_i, \ldots, w_{i+l-1}\}$, each-word-in$\{dt_k\}$)+

$b_5$*(word2vec(each-word-in$\{w_i, \ldots, w_{i+l-1}\}$)− word2vec(each-word-in$\{dt_k\}$)^2 where weights, $b_1+b_2+b_3+b_4+b_5=1$

If the value of the cost function $C(\{w_i, \ldots, w_{i+l-1}\}, dt_k)$ is greater than the pre-determined threshold T then $\{w_i, \ldots, w_{i+l-1}\}$ may be replaced with the dt*, otherwise the $\{w_i, \ldots, w_{i+l-1}\}$ is maintained as it is. Accordingly, if $(C(\{w_i, \ldots, w_{i+l-1}\}), dt_k) < T)$ replace $\{w_i, \ldots, w_{i+l-1}\}$ in $S \leftarrow \{dt^*\}$ in S In accordance with the present disclosure, the pre-determined threshold T is based on the identified current environment. The threshold T may be smaller in a cleaner environment allowing only the w* which is very close to the asr_out in terms of the cost function C(asr_out, w*); however if the environment is noisy, then the threshold T is larger so that allowance is given to w* that is much further from asr_out. The threshold T which is a function of the environment is thus pre-determined based on the environment to account for a noisy environment, wherein the general purpose ASR is bound to make more serious errors compared to its performance in a cleaner environment.

The cost function, C, may also change based on the environment. For example, in a particular environment the weightage $b_x$ in the above equation may be zero, while in another environment $b_x$ may be a non-zero value. Depending on the environment, other variables too in the equation may have varying values. In an embodiment, depending on an environmental information, a new sub-part may be introduced in the above equation such as, b6=double-metaphone (each-word-in $\{w_i, \ldots, w_{i+l-1}\}$, each-word-in $\{dt_k\}$), and the like. Thus $S_{first-level-repaired}$=original S with replaced terms. It may be noted that the first stage repair may or may not actually repair the text output of the GP-ASR as it depends on the match, threshold and fitness function.

Based on the above description, in accordance with an embodiment of the present disclosure, the fitness function for domain ontology based correction is a weighted cost function that matches the text output with a first set of candidate terms from the domain ontology based on a sliding window mechanism; and replaces the one or more erroneously recognized terms in the text output with one or more best-fit terms from the first set of candidate terms from the domain ontology based on the pre-determined threshold associated with the identified current environment.

With regards to the second stage of correction viz., contextual correction of the matching stage output, the number of domain-ontology-terms that are referred to in the sentence ($S_{first-level-repaired}$) first after the first stage repair are considered. A sliding window is used to determine the terms that a mapping function should consider. The size of the sliding window may change based on the identified current environment. Let $S_{candidates}=\{w_1, w_2, w_3, \ldots w_n\}$ be a set of words in the sentence $S_{first-level-repaired}$ that have not been replaced by domain-ontology-terms in the first stage repair. A sliding window of length r consisting of words $\{w_i, \ldots, w_{i+r-1}\}$ in $S_{candidates}$ is considered for the mapping function. The length r may vary from 1 to q, where q is decided based on the identified current environment. For example, if the domain under consideration has financial terms then q may be five words, while if the domain pertains to car parts, q may be two words.

The mapping function evaluates those domain-ontology-terms that together imply a candidate term to replace erroneously recognized terms in the sentence. Let $D=\{dt_1, dt_2, dt_3, \ldots dt_{nm}\}$ be a set of domain-ontology-terms that are closely related and occur in $S_{first-level-repaired}$. In the context of the present disclosure, 'closely-related' refers to domain-ontology-terms that have a 'parent-child' relationship or a 'common-parent-node' relationship in the domain-ontology.

A cost function, say $Q(\{w_1, \ldots, w_{i+r-1}\}, dt_k)$ is computed such that minimizing $Q(\{w_i, \ldots, w_{i+r-1}\}, dt_k)$ would result in dt* which is a possible candidate to replace $\{w_i, \ldots, w_{i+r-1}\}$, namely, $$dt^* = \min\_\{G\} Q(\{w_i, \ldots, w_{i+r-1}\}, dt_k)$$

The cost function $Q(\{w_i, \ldots, w_{i+r-1}\}, dt_k) =$ $$z_1 * \text{soundex}(\text{each-word-in}\{w_i, \ldots, w_{i+r-1}\}, \text{each-word-in}\{dt_k\}) +$$

$$z_2 * \text{metaphone}(\text{each-word-in}\{w_i, \ldots, w_{i+r-1}\}, \text{each-word-in}\{dt_k\}) +$$

$$z_3 * (\text{edit\_distance}(\text{each-word-in}\{w_i, \ldots, w_{i+r-1}\}, \text{each-word-in}\{dt_k\}))$$

where weights $z_1 + z_2 + z_3 = 1$
If the value of the cost function $Q(\{w_i, \ldots, w_{i+r-1}\}, dt_k)$ is greater than a given threshold T2 then $\{w_i, \ldots, w_{i+r-1}\}$ is replaced with the dt*.

The cost function computes the best-fit candidate term based on how many other domain-ontology-terms are referred to in the sentence. The cost function may also change based on the identified current environment.

Based on the above description, in accordance with an embodiment of the present disclosure, the fitness function for contextual correction is a weighted cost function that maps the matching stage output with a second set of candidate terms from the domain ontology based on a sliding window mechanism; and replaces the one or more erroneously recognized terms in the matching stage output with one or more best-fit terms from the second set of candidate terms from the domain ontology based on the pre-determined threshold associated with the identified current environment.

With regards to the third stage of correction viz., linguistic correction of the mapping stage output, the number of linguistic-terms that are referred to in the sentence after the second-level repair is considered. The sentence repaired after the second-level-repair, $S_{second-level-repaired}$, is parsed and the parts-of-speech tags (POS-tags) are considered for linguistic repair using linguistic rules. Linguistic rules, that are well known, such as 'Wh-pronoun' should follow a 'Wh-determiner' are applied. In an embodiment, the linguistic repair fitness function may be defined as F=max(phonetic-match(erroneous-words-in-$S_{second-level-repaired}$, linguistic-rules-specified-candidate-words)

For example, suppose the sentence to repair after second-level repair is "which business has more sales in 2013 car dealers for optical quotes?". First the partially corrected sentence is parsed as "which/WDT, business/NN, has/VBZ, more/JJR, sales/NNS, in/IN, 2013/CD, car/NN, dealers/NNS, for/IN, optical/JJ, goods/NNS" In the linguistic repair, it may be noted that there is no direct ontological relationship between "car dealers" and "optical goods", thus the preposition for may not be used between the two domain terms. The method of the present disclosure looks for a linguistic relation that is permissible between the two domain terms. One of the options is a conjunction or a disjunction between the domain terms, thus linguistic relations like AND or OR between the domain terms are considered. It may be noted that OR matches closely with "for" through a phonetic match rather than AND. Hence FOR is replaced with OR to obtain the repaired sentence as: "which business has more sales in 2013 car dealers or optical goods?". The linguistic rules to apply may change based on the identified current environment. For example, people residing in a particular region may tend to use pronouns more often than people in other regions, and the like.

Based on the above description, in accordance with an embodiment of the present disclosure, the fitness function for the linguistic correction is a function of the mapping stage output and a set of semantic and linguistic repair rules.

Figure 4:
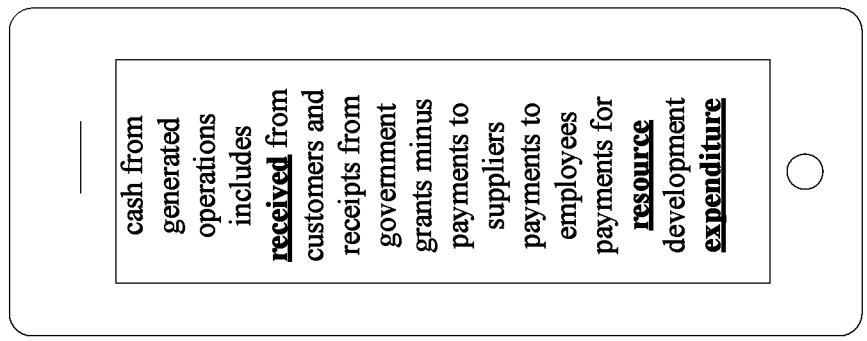
FIG. 4 illustrates repair of an exemplary automatic speech recognition (ASR) output, in accordance with an embodiment of the present disclosure.
Figure 4:

FIG. 4 illustrates repair of an exemplary Automatic Speech Recognition (ASR) output, in accordance with an embodiment of the present disclosure. In the illustration, ds: stands for 'domainsource' and ns stands for 'naturalschema. Each of these represent a Uniform Resource Identifier (URI) in Resource Description Framework (RDF). An exemplary speech from a speaker is "Cash from generated operations includes Receipts from customers and Receipts from government grants minus Payments to suppliers Payments to employees Payments for research development expenditures". A GP-ASR text output for this exemplary speech was "cash from generated operations includes received from customers and receipts from government grants minus payments to suppliers payments to employees payments for resource development expenditure". The GP-ASR text output may be parsed and part of speech (POS) tags are evaluated. The three stage correction is then initiated in accordance with the present disclosure to obtain a repaired sentence as "Cash from generated operations includes Receipts from customers and Receipts from government grants minus Payments to suppliers Payments to employees Payments for research development expenditures".

Thus in accordance with the present disclosure, a three stage correction involving domain based correction, contextual correction followed by linguistic correction taking into consideration the identified current environment in which the speaker speaks and accordingly pre-determining the threshold of the fitness function improves the accuracy of the text output of the GP-ASR making it suitable for deeper natural language processing.

Post ASR output corrections known in the art have been based on the availability of confidence score of the ASR engine. Accordingly, all the low confidence score output words are assumed to have been erroneously identified and hence the conventional methods try to correct them. In accordance with methods of the present disclosure, there is no dependency on any information pertaining to the ASR, say in the form of the confidence scores associated with the output words or the type of ASR used or the characteristics of the ASR. The systems and methods of the present disclosure facilitate repair of the text output from any ASR engine and can correct it for a given domain.

Figure 5:
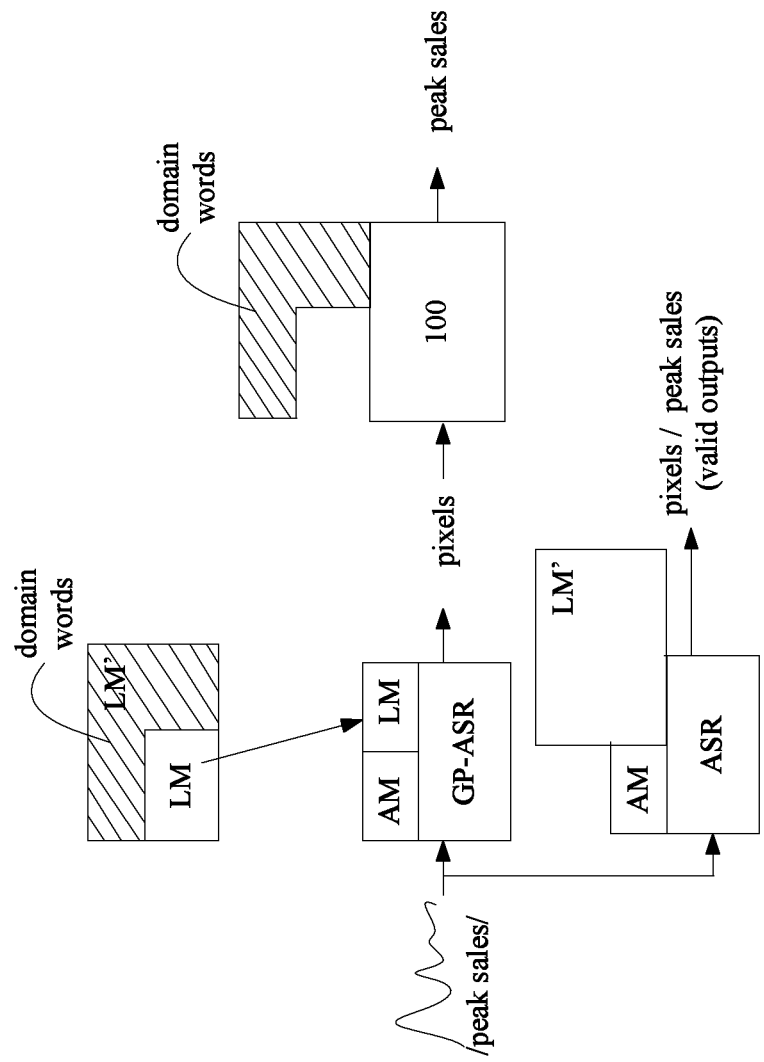
FIG. 5 illustrates a schematic representation of output text from a general purpose ASR corrected using the method of the present disclosure vis-à-vis output text from a domain specific ASR.

FIG. 5 illustrates a schematic representation of output text from a general purpose ASR corrected using the method of the present disclosure vis-à-vis output text from a domain specific ASR. Domain ontology as used in the speech engine and as used in text processing are different. In case of text, in the present disclosure S-P-O triples (namely, subject-predicate-object triples) are used while in speech, n-gram language model may be employed. In spite of this difference, even if domain specific words were considered into an ASR language model the performance of the ASR would be poorer than using domain specific words as suggested in the present disclosure. Say there is an existing language model (LM) associated with the speech engine. Let domain specific words be added to the LM to create a new language model LM' making LM' a superset containing both the words in the existing LM and the words from the domain. For a given utterance LM' would make more errors since there is an increase in the number of words in LM' thereby increasing the perplexity. For example if a scenario wherein "pixel" is part of the LM and "peak sales" is part of the domain and hence part of LM' together with "pixel" is considered, the ASR may return either "pixels" or "peak_sales" because phonetically both the terms are close to each other and there is no way for the ASR to say which of these two is correct. However, when the methods of the present disclosure are used, since there is only "pixels" as part of the LM, an ASR would return only "pixels". Also, it is known that "peak_sales" is part of the domain and "pixel" is not, thereby making it easier for the methods of the present disclosure to conclude that "peak_sales" and not "pixels" is the word of choice. Thus it may be concluded that a GP-ASR coupled to a domain ontology as described in the present disclosure yields better accuracy than a domain specific ASR.

EXPERIMENTAL OUTPUT

The Evo-Devo inspired artificial development methods and systems thereof of the present disclosure were tested to repair the ASR engine's text output of spoken sentences in a financial domain along with Google Now™ ASR engine's text output. A comparative analysis of the output of Google Now™ vis-à-vis the systems and methods of the present disclosure clearly demonstrate improved accuracy of speech to text conversion as seen herein below.

TABLE

Comparative output and accuracy

| Human spoken sentence (Hx), Google ASR output (Gx), Sentence repaired by method of the present disclosure (Ex) | WER Accuracy % of G, E |
|---|---|
| H2: The return on plan assets include interest earned, dividends earned, realized and unrealized gains or losses less taxes payable by the plan less administrative costs of the plan. | |
| G2: the return on plan acids include interest on dividends and realized and unrealized games or losses less taxes payable by the plan let administrative process of the plan | G2: 64.2 |
| E2: the return on plan assets include interest on dividends and realized and unrealized gains or losses less taxes payable by the plan let administrative process of the plan | E2: 75.0 |
| H3: Actuarial gain or loss refers to an increase or decrease to a company's estimate of the Fair Value of Plan Assets as a result of either change in assumption or experience adjustments. | |
| G3: actuarial gain or loss refers to an increase or decrease tour companies estimate of the fair value of planets as a result of either changed and assumption or experience at judgements | G3: 62.5 |
| E3: actuarial gain or loss refers to an increase or decrease tour companies estimate of the fair value of plan assets as a result of either changed and assumption or experience at judgements | E3: 71.8 |
| H4: Expenditure in foreign currency includes research development expenses and intangible assets related charges | |
| G4: Expenditure in foreign currency includes resource development expenses and intangible assets let it charge | G4: 61.53 |
| E4: Expenditure in foreign currency includes research development expenses and intangible assets charges | E4: 92.3 |

Systems and methods of the present disclosure thus provide a comprehensive generic framework that is independent of a specific language or domain or use of a specific solution for a specific problem and allows for step by step repair of the text output of any ASR engine without using any acoustic cues from that engine.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method comprising:
receiving a text output from a general purpose automatic speech recognition (GP-ASR) engine;
identifying in real-time, a current environment of a speaker associated with the text output based on one or more environment variables; and
automatically identifying one or more erroneously recognized terms in the text output and selectively correcting the output of the GP-ASR by replacing the one or more erroneously recognized terms in the text output with one or more best-fit terms by performing multi-stage correction steps on the received text output, using a pre-determined threshold for a fitness function, wherein the pre-determined threshold is a function of environment and is determined based on the identified current environment, wherein the fitness function is a function to determine candidate terms for replacement of the one or more erroneously recognized terms in the text output, and wherein the multi-stage correction steps comprise:
a first stage of domain ontology based correction, wherein at least one of a phonetic-level match and an edit-distance-level-match is performed to obtain a matching stage output, wherein the matching stage output comprises matching of a first set of candidate terms from domain ontology with the text output based on a sliding window mechanism which consists of a predetermined number of words of the text output;
a second stage of contextual correction of the matching stage output, wherein at least one of the contextual phonetic-level match and the edit-distance-level-match is performed to obtain a mapping stage output, mapping the matching stage output with a second set of candidate terms from the domain ontology based on a sliding window mechanism; and
a third stage of linguistic correction of the mapping stage output, wherein semantic and linguistic repair rules based on the identified current environment are applied on the mapping stage output to obtain a domain specific repaired output corresponding to the output of the GP-ASR.

2. The processor implemented method of claim 1, further comprising:
receiving speech input associated with the speaker and information pertaining to the identified current environment; and
deriving the one or more environment variables from the received speech input and the information pertaining to the current environment.

3. The processor implemented method of claim 2, wherein the one or more environment variables are based on one or more of location information associated with the speaker; movement information associated with the speaker; olfactory information; proximity information; and image information.

4. The processor implemented method of claim 1, wherein the identified current environment is classified one of a broad classification and a granular classification.

5. The processor implemented method of claim 1, wherein the pre-determined threshold is empirical.

6. The processor implemented method of claim 1, wherein the first stage through third stage are iteratively repeated based on the real-time current environment.

7. The processor implemented method of claim 1, wherein the fitness function for domain ontology based correction is a weighted cost function that matches the text output with a first set of candidate terms from the domain ontology based on a sliding window mechanism; and replaces the one or more erroneously recognized terms in the text output with one or more best-fit terms from the first set of candidate terms from the domain ontology based on the pre-determined threshold associated with the identified current environment.

8. The processor implemented method of claim 1, wherein the fitness function for contextual correction is a weighted cost function that maps the matching stage output with a second set of candidate terms from the domain ontology based on a sliding window mechanism and replaces the one or more erroneously recognized terms in the matching stage output with one or more best-fit terms from the second set of candidate terms from the domain ontology based on the pre-determined threshold associated with the identified current environment.

9. The processor implemented method of claim 1, wherein the fitness function for the linguistic correction is a function of the mapping stage output and a set of semantic and linguistic repair rules.

10. A system comprising:
one or more data storage devices operatively coupled to one or more hardware processors and configured to store instructions configured for execution by the one or more hardware processors to:
receive a text output from a general purpose automatic speech recognition (GP-ASR) engine;
identify in real-time, a current environment of a speaker associated with the text output based on one or more environment variables associated thereof; the identified current environment being classified as at least one of a broad classification and a granular classification; and
automatically identifying one or more erroneously recognized terms in the text output and selectively correct the output of the GP-ASR by replacing the one or more erroneously recognized terms in the text output with one or more best-fit terms by performing multi-stage correction steps on the received text output, using a pre-determined threshold for a fitness function, wherein the pre-determined threshold is a function of environment and is determined based on the identified current environment, wherein the fitness function is a function to determine candidate terms for replacement of the one or more erroneously recognized terms in the text output, and wherein the multi-stage correction steps comprise:

a first stage of domain ontology based correction, wherein at least one of a phonetic-level match and an edit-distance-level-match is performed to obtain a matching stage output, wherein the matching stage output comprises matching of a first set of candidate terms from domain ontology with the text output based on a sliding window mechanism which consists of a predetermined number of words of the text output;

a second stage of contextual correction of the matching stage output, wherein at least one of the contextual phonetic-level match and the edit-distance-level-match is performed to obtain a mapping stage output, mapping the matching stage output with a second set of candidate terms from the domain ontology based on a sliding window mechanism; and a third stage of linguistic correction of the mapping stage output, wherein semantic and linguistic repair rules based on the identified current environment are applied on the mapping stage output to obtain a domain specific repaired output corresponding to the output of the GP-ASR.

11. The system of claim 10, wherein the one or more hardware processors are further configured to:

receive speech input associated with the speaker and information pertaining to the current environment associated thereof; and derive the one or more environment variables from the received speech input and the information pertaining to the current environment.

12. The system of claim 10, wherein the one or more environment variables are based on one or more of (i) location information associated with the speaker; (ii) movement information associated with the speaker; (iii) olfactory information; (iv) proximity information; and (v) image information.

13. The system of claim 10, wherein the pre-determined threshold is empirical.

14. The system of claim 10, wherein the one or more hardware processors are further configured to perform the domain ontology based correction, wherein the fitness function is a weighted cost function that matches the text output with a first set of candidate terms from the domain ontology based on a sliding window mechanism; and replaces the one or more erroneously recognized terms in the text output with one or more best-fit terms from the first set of candidate terms from the domain ontology based on the pre-determined threshold associated with the identified current environment.

15. The system of claim 10, wherein the one or more hardware processors are further configured to perform the contextual correction, wherein the fitness function is a weighted cost function that maps the matching stage output with a second set of candidate terms from the domain ontology based on a sliding window mechanism; and replaces the one or more erroneously recognized terms in the matching stage output with one or more best-fit terms from the second set of candidate terms from the domain ontology based on the pre-determined threshold associated with the identified current environment.

16. The system of claim 10, wherein the one or more hardware processors are further configured to perform the linguistic correction, wherein the fitness function is a function of the mapping stage output and a set of semantic and linguistic repair rules.

17. A computer program product comprising a non-transitory computer readable medium having a computer readable program embodied therein, wherein the computer readable program, when executed on a computing device, causes the computing device to:

receiving a text output from a general purpose automatic speech recognition (GP-ASR) engine;

identifying in real-time, a current environment of a speaker associated with the text output based on one or more environment variables; and automatically identifying one or more erroneously recognized terms in the text output and selectively correcting the output of the GP-ASR by replacing the one or more erroneously recognized terms in the text output with one or more best-fit terms by performing multi-stage correction steps on the received text output, using a pre-determined threshold for a fitness function, wherein the pre-determined threshold is a function of environment and is determined based on the identified current environment, wherein the fitness function is a function to determine candidate terms for replacement of the one or more erroneously recognized terms in the text output, and wherein the multi-stage correction steps comprise:

a first stage of domain ontology based correction, wherein at least one of a phonetic-level match and an edit-distance-level-match is performed to obtain a matching stage output, wherein the matching stage output comprises matching of a first set of candidate terms from domain ontology with the text output based on a sliding window mechanism which consists of a predetermined number of words of the text output;

a second stage of contextual correction of the matching stage output, wherein at least one of the contextual phonetic-level match and the edit-distance-level-match is performed to obtain a mapping stage output, mapping the matching stage output with a second set of candidate terms from the domain ontology based on a sliding window mechanism; and a third stage of linguistic correction of the mapping stage output, wherein semantic and linguistic repair rules based on the identified current environment are applied on the mapping stage output to obtain a domain specific repaired output corresponding to the output of the GP-ASR.

* * * * *